United States Patent
Hogan et al.

(10) Patent No.: US 6,749,113 B2
(45) Date of Patent: Jun. 15, 2004

(54) SYSTEM FOR CARD PROCESSING, EMBOSSING AND FULFILLMENT

(75) Inventors: Sharon K. Hogan, Omaha, NE (US); Douglas K. Wright, Papillion, NE (US); Trent W. Gutschenritter, Pacific Junction, IA (US); Michelle Buggs, Omaha, NE (US); Jim K. Prendergast, Omaha, NE (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 10/109,459

(22) Filed: Mar. 26, 2002

(65) Prior Publication Data

US 2003/0183687 A1 Oct. 2, 2003

(51) Int. Cl.⁷ .............................................. G06K 5/00
(52) U.S. Cl. ................................... 235/380; 235/487
(58) Field of Search ................................. 235/486, 487, 235/380, 379, 382, 472.02; 705/35, 39, 40

(56) References Cited

U.S. PATENT DOCUMENTS 5,774,882 A * 6/1998 Keen et al. .................... 705/38
5,950,179 A * 9/1999 Buchanan et al. ............. 705/38
6,308,887 B1 * 10/2001 Korman et al. ............. 235/379
6,315,194 B1 * 11/2001 Graef et al. ................ 235/379
6,335,799 B1 * 1/2002 Provost ....................... 358/1.4
6,402,028 B1 * 6/2002 Grham, Jr. et al. ......... 235/380
6,446,832 B1 * 9/2002 Holec et al. .................. 221/88

FOREIGN PATENT DOCUMENTS

JP 2000172757 * 6/2000 ............ G06K/1/00
JP 2000311213 * 11/2000 ............ G06K/1/12

* cited by examiner

Primary Examiner—Daniel St.Cyr
(74) Attorney, Agent, or Firm—Townsend and Townsend and Crew LLP (57) ABSTRACT

A system and method for processing a request for a CIU (card issuance unit), and embossing the CIU for a cardholder. A CIU is a credit card, smart card, phone card or the like. The system processes a CIU request from receipt through embossment until the CIU is sent to the client. When received, the CIU request contains initial account information about the cardholder. The system creates a shell having a record of the initial information. When the record is selected, a CIU is embossed for the selected record. If updated account information which changes the initial record is received, the CIU is completed with the updated account information. Further, the CIU is fulfilled when a production facility has the capability to fulfill all of the selected records. A status update interface is provided for tracking the CIU through the production process.

15 Claims, 5 Drawing Sheets

```
1  | @CIU 02200200350015001
2  |                    PLASTIC DETAIL DISPLAY              11/18/YYYY 10:55
3  |                                                             PAGE 1 OF 3
4  | PLAST ID:    0220 0200 3901 5001    CARDHOLDER NAME: RICHARD J WAYNE
5  | XREF NO:
6  | STATUS:      D PROD PLSTK NO: 00000990999  MEM SINCE: 07/1997 DUALITY: 0
7  | DELAY: 0 DAYS TIP COLOR:016       VALID DT:     07/2000 CREATE WK:0
8  | SHIP DT:                 CARD ACTV: 00000000999   EXPIRE DT:   07/2002
9  | CREATE RUN DT:      11/04/2001                 TRACKING NO: 11/04/2001
10 | PHOTOCARD                              ULTRAGRAPHICS
11 | IMAGE ID:                                                  FRONT BACK
12 | CATLG ID:                              COLOR:
13 | SIZE:                                  FORMAT:
14 | BEGIN DT:                              PCF LOGO ID:
15 |                                        CARDHOLDER LEVEL LOGO 1: 00055 0123
16 |                                        CARDHOLDER LEVEL LOGO 2:
17 |                                        CARDHOLDER LEVEL LOGO 3:
18 | ULTRAGRAPHICS STRING ON NEXT PAGE
19 | PF1 = HELP              PF3 = EXIT PF4 = ARCHIV PF5 = CCAR PF6 = STRATEGY
20 | PF7 = BKWD PF8 = FWD PF9 = INSR                        PF12 = CANCEL
21 |
```

```
(DEVTWG/OLR3490)    Plastics Summary Screen    12/12/01    13:35:42
 TGUTSCH                    ORDERED Type options, press Enter
     5=Detail Rows
Position To..
Opt Cycle  Input              Review            Plastic   Carrier
           Date       Prty    Week     Pass     Count     Count
        C  01/15/2002   2       0      Rush      100       90
        C  01/15/2002   3       0      Daily1    150      140
        B  01/15/2002   2       0      Rush       50       40

F3=Exit  F5=Refresh  F7=Pulled  F10=Navigator  F12=Cancel  F17=Top  F18=Bottom
```

FIG. 5

```
(IMSELIB/OLR3490)    Plastics Summary Screen    12/14/01    13:47:15
 TGUTSCH                    ORDERED Type options, press Enter.
  1=Select  2=Unselect  5=Display Input       Comp       Review          Plastic
Carrier
           Opt Date  Prty  Tape#  Type  Pass   Week  Client  Count
Count Selected
           01/15/2002  1   001RK   D    RUSH    0    1234     40
30
           01/15/2002  1   001RK   J    RUSH    0    1234     60
60
F3=Exit  F5=Refresh  F7=Pulled  F10=Navigator  F12=Cancel  F17=Top  F18=Bottom
```

FIG. 6

SYSTEM FOR CARD PROCESSING, EMBOSSING AND FULFILLMENT

BACKGROUND OF THE INVENTION

The present invention relates generally to the field of processing card issuance units (e.g., credit cards, smart cards and the like) and more specifically to a system and method for receiving card issuance unit requests, processing, embossing and fulfilling such card issuance units.

Conventional systems for receiving card issuance unit requests, processing, embossing and fulfilling such card issuance units (CIU) are generally known. A CIU is a cardholder plastic item such as a credit card or a smart card, alone or in combination with other associated components such as a card carrier, a personal information number mailer and the like. Many institutions typically provide credit cards or smart cards to their customers. For example, upon approving a credit card account for its customer, a bank e.g., Bank of America will provide a credit card to the cardholder. As another example, a smart card network may send an electronic purse such as a smart card and a personal identification number to its subscriber.

These CIUs are typically produced by third parties often unrelated to the institutions. When an institution desires a CIU for a cardholder, it forwards the cardholder's information to the third party. If the CIU is credit card, for example, the third party receives the cardholder information and begins the process of embossing the credit cards. Embossing refers to imprinting the cardholder's name and account number, for example, on the credit card. Disadvantageously, in some instances, the conventional embossing process does not account for changes in cardholder information that can arise after a CIU is requested.

Therefore, there is a need to resolve one or more of the aforementioned problems relating to conventional systems for processing card issuance units and, the present invention meets this need.

BRIEF SUMMARY OF THE INVENTION

According to one embodiment of the present invention, a system and method for processing a request for a CIU (card issuance unit), and embossing the CIU for a cardholder is disclosed. If the CIU is a credit card for example, the CIU request is received from an institution such as a bank or the like that desires a credit card for its customer. The system of the present invention processes the request from receipt through embossment until the credit card is shipped to the client. The CIU request typically contains initial account information about the cardholder. This information is aggregated by customer records in a shell. When one or more records are selected, the credit cards for those records are embossed. If updated account information which changes the initial account information is received, the CIU is embossed with the updated account information. Further, the CIU is fulfilled when a production facility has the capability to fulfill all of the selected records. A status update interface is provided for tracking the CIU from the initial order through shipping.

According to another embodiment of the present invention, a method for processing and fulfilling a request for a card issuance unit for a cardholder is taught. The method employs a computing system having one or more computing devices. A request for a card issuance unit is received by the computing system. The request contains initial account information about the cardholder which is then stored. The computing system creates a shell having a record that contains at least a portion the initial account information or an identifier for identifying the account information. If the computing system receives updated account information which supplements or substitutes a portion or all of the initial account information, the updated account information is stored. The records are selected from a summary row which groups "like" shells for processing, after which the card information unit is fulfilled by using the updated account information.

According to a further embodiment of the present invention, a system for processing an emboss request for a credit card, and embossing the credit card is disclosed. The system includes software instructions for determining a number of embossing records available for production, and for grouping such records. The system also includes software instructions for receiving selections of embossing records for processing, and for embossing the credit cards. The credit cards are embossed based on the selected embossing records having the most updated information available. Further, the system includes software instructions to assist in sorting the credit cards or associated records into identifiable groups, and for identifying the embossing records for which information has changed after the record has been embossed.

According to yet another embodiment of the present invention, a method for processing a card issuance unit is taught. The method includes storing initial cardholder information about a cardholder in a database. The initial cardholder information is for obtaining the card issuance unit associated with a cardholder. A record containing at least a portion the initial cardholder information or containing an identifier for identifying the cardholder information is then provided. If updated cardholder information is available, the record is updated to supplement or substitute at least a portion or all of the initial cardholder information with the updated cardholder information. The card issuance unit is fulfilled with the record having the updated cardholder information.

According to another aspect of the present invention, a status update for providing information regarding where a CIU is within the production process is available to a client.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Briefly, a system and method for processing a request for a CIU (card issuance unit), and embossing the CIU for a cardholder is disclosed. A CIU is a cardholder plastic item such as a credit card or smart card alone or in combination with a card carrier, a card activation letter, an acknowledgment mailer, PIN (personal identification number) mailer, a post mailer, inserts or the like. Many institutions typically provide credit cards or smart cards to their customers. For example, upon approving a credit card account for its customer, a bank e.g., Bank of America will provide a credit card to the cardholder. These CIUs are typically produced by third parties that receive and process the CIU request. One such system for receiving and fulfilling such CIU requests is the system and method of the present invention.

An institution desiring a CIU for a cardholder forwards the cardholder's information to the present system. If the CIU is a credit card for example, the cardholder information is received by a computing system of the present invention. When received, the credit card request contains initial account information about the cardholder. The system creates a shell having a record of the initial information. When the record is selected, a credit card is embossed for the selected record. After embossment, the card is attached to a card carrier and inserted into an envelope for mailing to the cardholder. If the cardholder account information changes prior to embossment, the updated information is automatically used for embossing the credit card. In this manner, the invention ensures that the cardholder record is updated, and the credit card fulfilled with the updated account information.

Figure 1:
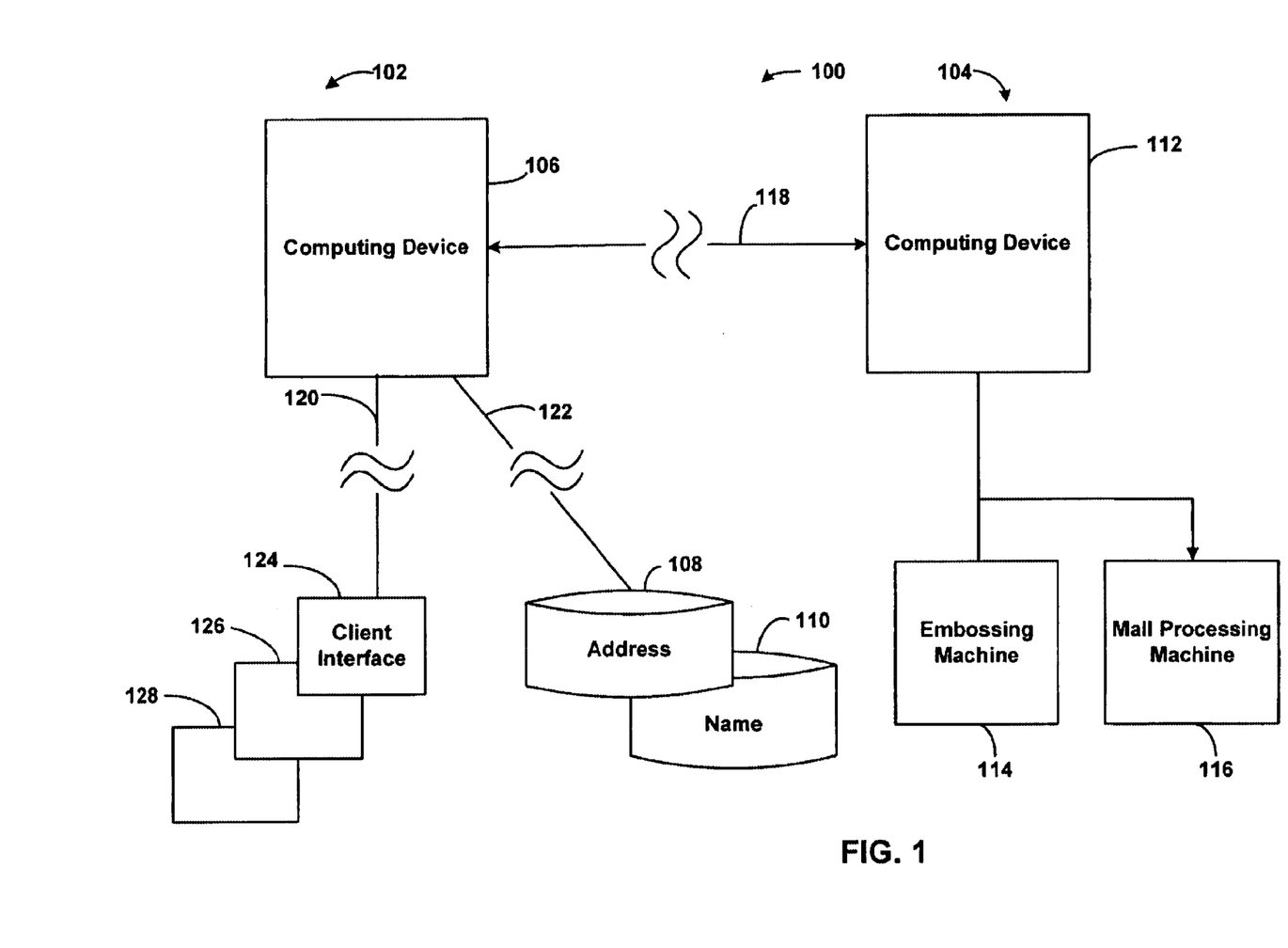
FIG. 1 is an exemplary block diagram of a CIU system for processing CIU requests in accordance with a first embodiment of the present invention.

FIG. 1 is an exemplary block diagram of a CIU system 100 for processing CIU requests in accordance with a first embodiment of the present invention. Among other components, CIU system 100 comprises a mainframe system 102 and a production facility system 104. Mainframe system 102 comprises a first computing device 106 for electronically receiving CIU requests from one or more client interfaces 124, 126, 128, and for building information necessary for fulfilling the CIU requests; and one or more databases including an address database 108 for storing cardholder addresses and a name database 110 for storing cardholder names. Computing device 106 may be a mainframe computer such as a VAX/VMS or the like available from DEC® (Digital Equipment Corporation).

Production facility system 104 comprises a second computing device 112 for processing and fulfilling CIU requests in conjunction with first computing device 106; an embossing machine 114 for embossing CIUs with personal information; and a mail processing machine 116 for generating card carriers, attaching cards to the carriers, providing any inserts and placing the materials into an envelope for mailing to the cardholders. Computing device 112 is typically an AS/400 computing device by IBM® (International Business Machines). The AS/400 is a 'midrange computer,' that falls between a mainframe and a PC server. It is a scalable, enterprise server that runs OS/400. One of ordinary skill in the art will realize that other computing devices within the spirit and scope of the present invention may be employed.

Figure 3A:
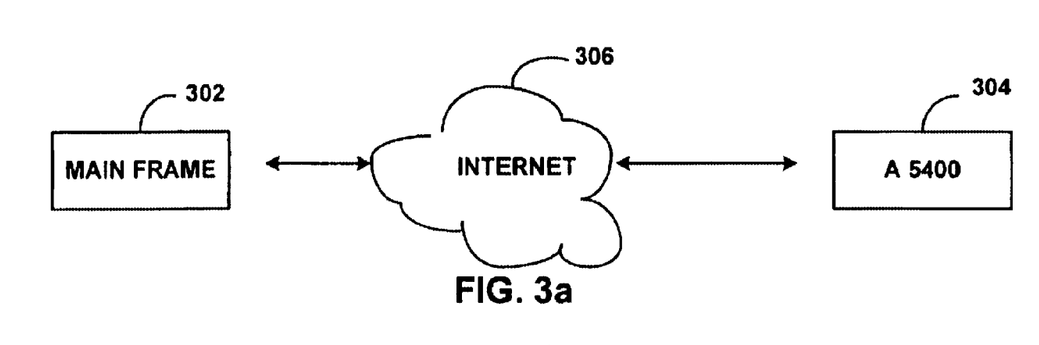
FIG. 3a is an exemplary block diagram illustrating remote coupling of the CIU system of FIG. 1.

Computing device 106 is communicably coupled to computing device 112 via a communication link 118. Communication link 118 may be a cable (e.g., RS232) or wireless link for example. In fact, as shown in FIG. 3a, the computing devices may be coupled via the Internet 306. Specifically, in FIG. 3a, a mainframe 302 is coupled via Internet 306 to an AS/400 304.

Briefly, in use, a client wishing to procure a CIU such as a credit card for a cardholder begins by sending an electronic request via client interface 124, 126 or 128 to computing device (mainframe) 106. The request contains initial information about the cardholder and associated information for fulfilling the credit card request. Upon receiving the request, mainframe 106 parses the initial information to retrieve information within specific fields of the request file for storage in specific databases. For example, the initial information is parsed to obtain address information which is stored in address database 108. Similarly, cardholder names are stored in database 110. Although not shown, various other information may be stored in other databases.

After the initial information is stored, if the initial information changes, the client is able to access mainframe 106 to enter, modify and save over the pre-existing information. The new information is stored by mainframe 106 in the appropriate databases. The information is stored as one or more records for each cardholder. These records are thereafter made available to the production facility system 104.

At this point, production facility system 104 operators begin the embossing process by selecting the desired records as further described with reference to FIG. 2. The records are selected via AS/400 112 which interacts with the mainframes in order to obtain the record. The record may be selected when the production facility has the capacity (equipment, personnel, etc.) to begin fulfillment of the credit card. The credit card is fulfilled using embossing machine 114 and mail processing machine 116.

Embossing machine 114 receives from AS/400 112 cardholder personalization information such as such as name, account number, expiration date, encoding information, etc. These are physically imprinted on the credit card. Mail processing machine 116 receives card carrier information such as where to send the card, the account number, primary cardholder name, credit limit to put on the carrier, etc. When it receives the credit card, it matches it with a card carrier. Thereafter, if there are information changes such as an address change, the record is modified before the credit card and the card carrier are inserted into an envelope. Further, one or more information or marketing inserts may be inserted into the envelopes.

Mail processing machine 116 includes components for achieving this function. Although not shown, such components may include a paper feeding mechanism for feeding sheets, a bin for receiving paper from the paper feeding mechanism; and a printer for printing alpha-numeric characters on the paper. One non-limiting example of how mail processing machine 116 may be constructed is disclosed in a U.S. application No. 10/045,889 entitled "Systems and Methods for Providing Inserts into Envelopes," filed Nov. 8, 2001 by the assignee of the present invention, the aforementioned application being hereby incorporated by reference as if fully set forth in the present invention.

After the credit card, the card carrier and other CIUs are inserted into the envelope, the envelope is mailed to the cardholder. Additional information such as the cardholder PIN is also mailed out to the cardholder. Another aspect of the present invention is that the client is able to track the credit card production process. Mainframe 106 provides the interface for achieving this functionality as further described with reference to FIGS. 2 through 4.

While the above has been described with respect to a credit card, one of ordinary skill in the art will realize that the system is equally applicable to other polymer type cards and card issuance units such as smart cards, phone cards and the like.

Figure 2:
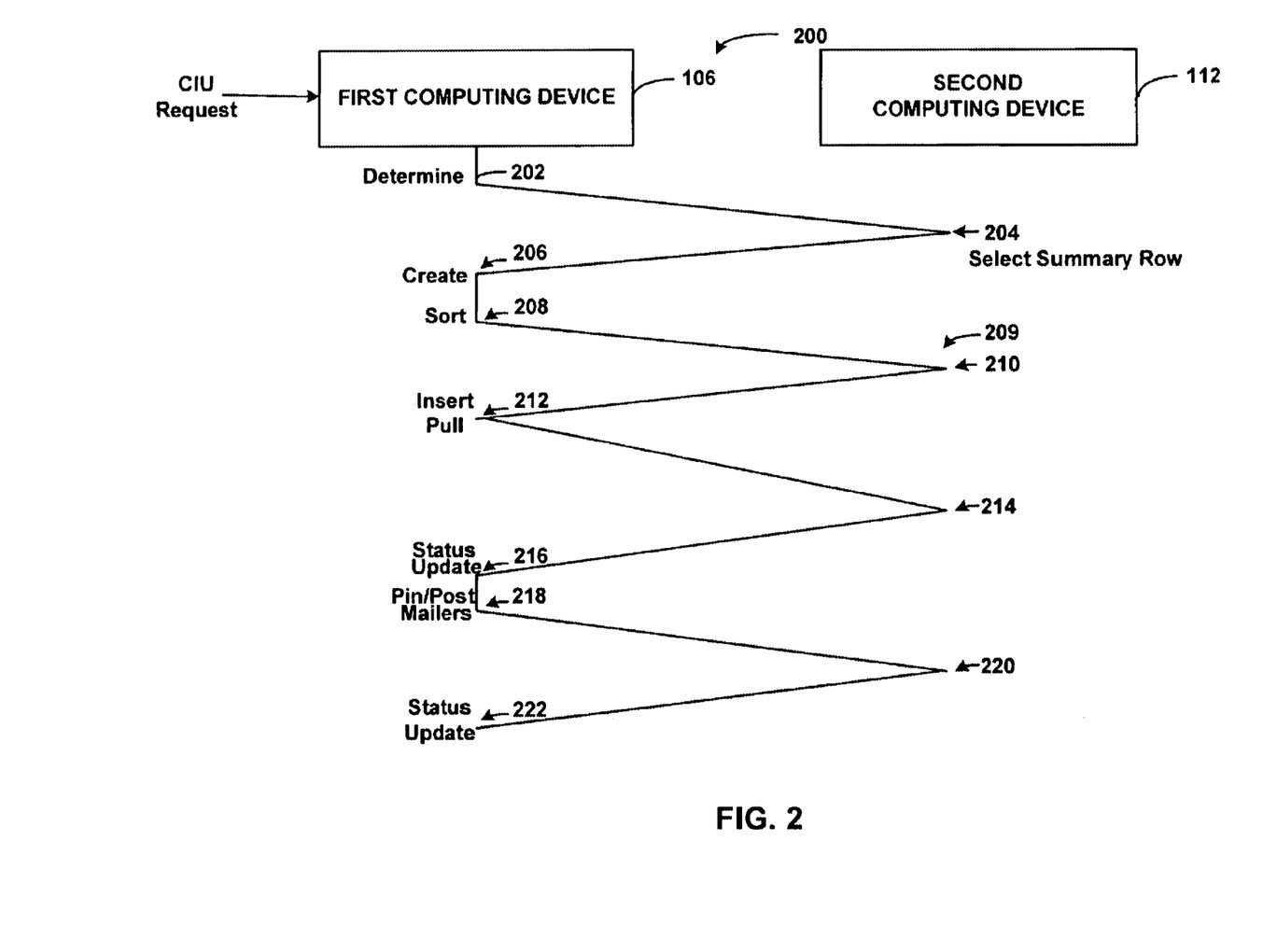
FIG. 2 is an exemplary flow diagram of a method for processing and fulfilling CIU requests in accordance with an embodiment of the present invention.

FIG. 2 is an exemplary flow diagram of a process 200 for processing and fulfilling CIU requests in accordance with an embodiment of the present invention. Among other components, process 200 is implemented by first computing device 106 and second computing device 112 of FIG. 1. As noted, first computing device is typically a mainframe computing device while second computing device is a midrange computing device such as the AS/400. As shown, process 200 consists of interactions between mainframe 106 and AS/400 112 and the processes running therein.

Generally, the process starts when a request for a CIU (e.g., a credit card) is received by mainframe 106. The request typically received via client interface 124 (FIG. 1) contains information to request a CIU for the associated cardholder. Subsequently, a shell and summary row containing at least one record having a portion or all of the account information is created. By selecting the record, the credit card is embossed with the cardholder's information by embossing machine 114. If the information has changed between the time the request is made and the card is generated, the system uses the updated information before it goes to the embossing machine. Thereafter, a card carrier for mailing the credit card to the cardholder is generated, matched with the card, and the CIU is mailed to the consumer. Shortly thereafter, a PIN (personal identification number) mailer is provided for sending the PIN associated with the card to the cardholder.

One advantage of process 200 is that it is automatic and provides an embossed credit card from request through changes and modifications up until the PIN is mailed to the cardholder. Although process 200 is illustrated with respect to a credit card, one of ordinary skill will realize the process 200 is applicable to other polymer type cards such as smart cards and phone cards. Further, such cards need not utilize PIN numbers in which case, no PIN mailer is sent to the cardholder.

As shown at step 202, a DETERMINE process is running on mainframe 106. As noted, each credit card request is electronically received by mainframe 106. It is from each request that information for the embossing and mailing records is obtained. DETERMINE identifies the embossing and mailer records that are available for production and groups them. Accompanying each request is information associated with the cardholder. Such information may be a cardholder name, e.g., John Doe, a cardholder address, account number, issue reason, e.g., force emboss or new account, and the client name, e.g., Bank of Colorado. Each respective piece of information is then stored in a separate database. That is, John Doe is stored in cardholder database 110 (FIG. 1) for example.

DETERMINE identifies all of this information and creates a shell. This shell is an information summary that may include an account no., client no., system, principal, agent, primary cardholder name, for example. It should be noted that other information may be included as needed. For example, a transaction date, time and issue reason may be included. All of this information is displayed on a transaction screen. Information not displayed on the screen but included in the shell for grouping of records includes processing characteristics, such as emboss type and processing type. Table 1 below is an exemplary embodiment of a transaction shell for an individual record in accordance with the present invention.

TABLE 1

| Primary Cardholder name | Account Number | Issue Reason | Agent | Transaction Date |
|---|---|---|---|---|

Figure 5:
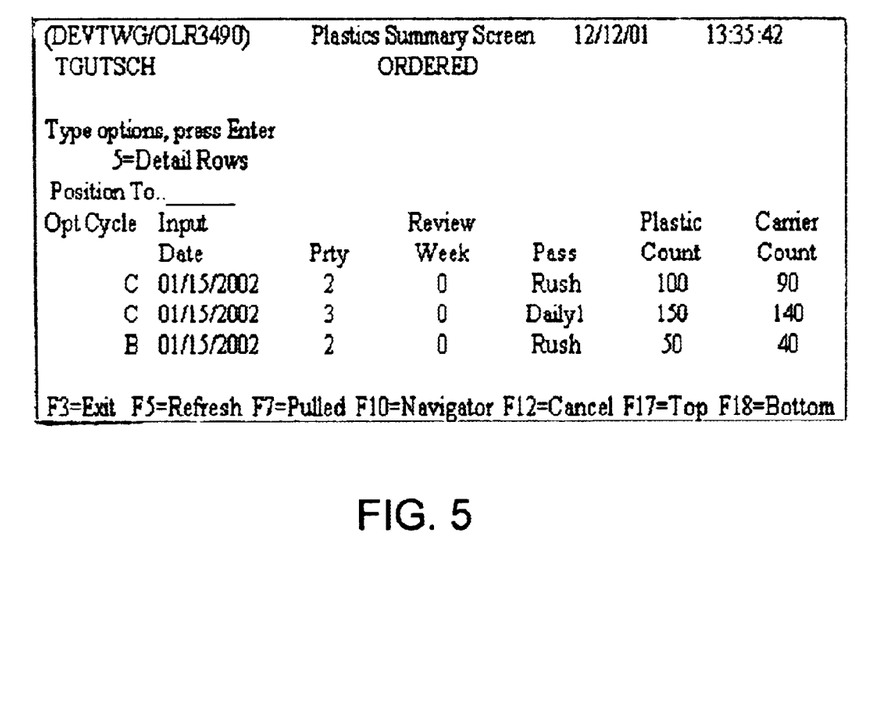
FIG. 5 is a screen shot illustrating an exemplary embodiment of a summary row that combines records with similar characteristics in accordance with the present invention.
Figure 6:
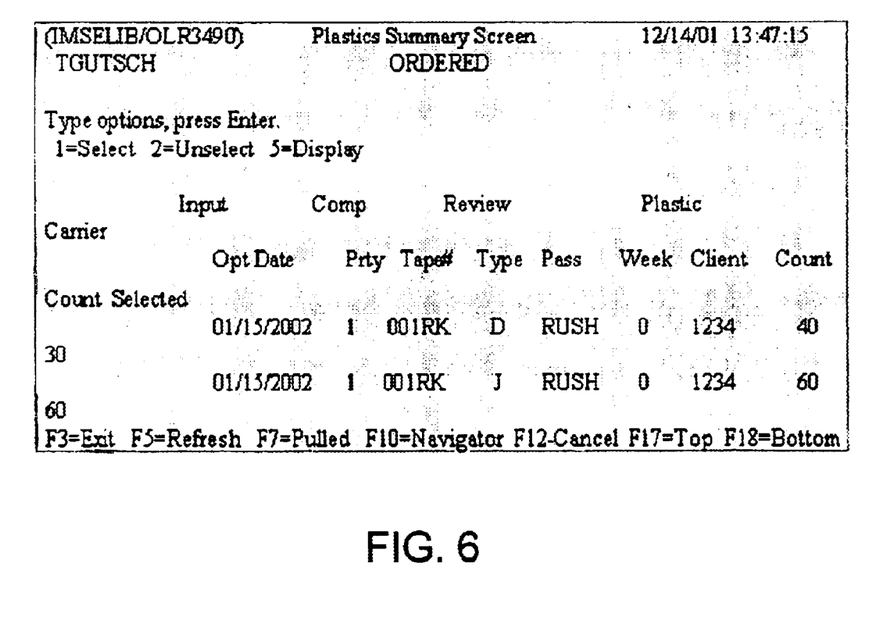
FIG. 6 is a screen shot that is displayed when the option "5=Detail Rows" in FIG. 5 is selected.

The shells may be grouped into a summary row containing all records having similar characteristics. FIG. 5 is a screen shot illustrating an exemplary embodiment of a summary row that combines records with similar characteristics in accordance with the present invention. In FIG. 5, the screen summarizes all of the transactions with similar characteristics for the production facility. A summary row includes: cycle code, input date, group #, plastic count, carrier count, emboss type, process type, and client. In FIG. 5, when the option 5=Detail Rows is selected, the screen shot in FIG. 6 is displayed.

If information for creating and segregating similar information is unavailable, DETERMINE may revolve allowing the client to provide the needed information. Since the client is connected via a computer network, the client is able to provide the required information. Another functionality of DETERMINE is to parse what is referred to as a PCF (product control file). It contains parameters to control various segments of CIU processing. A PCF enables the client to specify the number of cards per carrier, the embossing format, etc.

Following the creation of the shell, the client may track the status of the credit card via a display screen. Since the client is remotely or locally coupled to mainframe 106, the client tracks the status via a display screen which indicates that the credit card has been accepted and the status is "ordered." At this point all of the like credit card records have been written to the shell with a summary table accessible by production facility system 104. Thereafter process 200 proceeds to step 204.

At step 204, the shell and summary row have been generated and is accessible to the production facility system 104. Production facility operators then select via AS/400 112 the summary row for which records to create. It should be observed that because of conditions on the accounts or records in the summary row, some records may not be created. Prior to selecting the summary row, however, the status of the credit card records remains in an "ordered" state. The credit card records remain in an ordered status until the production facility has the capacity (equipment, personnel etc.) to begin fulfillment.

Herein lies one advantage of the present invention. Unlike processing systems wherein records are built weeks or sometimes months in advance of need, the records are built on-demand when the production facility can fulfill the credit cards. This permits the updated account information to be used for building the records. For example, assume that a credit card request received on July 1 can be fulfilled on July 24 due to capacity constraints. If the request information changes on July 23, the client via an interface on mainframe 106 makes the desired changes on July 23. The client is able replace, modify and save over the pre-existing information. On July 24, the production facility operators select this record for creation, and CREATE begins to build the records with the updated account information saved on July 23. After the records are selected by the production facility operators, process 200 proceeds to step 206.

At step 206, a CREATE process is active on mainframe 106. CREATE pulls all of the information for records selected at step 204 from the various databases. When the records to create are selected, CREATE begins to build the records with the updated account information available.

At step 208, a SORT process on mainframe 106 sorts all of the completed records for the credit cards into like groups, e.g., and assigns sequence numbers and lot numbers. This permits easy tracking of the credit cards. Records are forwarded to the production facility.

At step 209, process 200 proceeds to AS/400 112 where the records for the credit cards are launched into a production facility management tool. The management tool lists even more intricate details about where records are in the production process.

At step 210, once the credit card records have been received by the production facility, a bill of materials is created indicating the materials required to fulfill the entire unit. If sufficient inventory isn't available, the unit is placed on "hold." This status and a reason for the hold is displayed. If there are no fulfillment issues, the records progress through the embossing process. The embossing process (by embossing machine 114) carries out personalization such as embossing, magnetic stripe encoding, CVV/CVC, Indent Print, Thermal Graphics, etc. In addition, a client may track the status of the card because a "production" status is displayed when CREATE is completed.

After the personalized cards and completed card carriers are matched, they move to tagging. Tagging is a process where the cards are stopped in the production process waiting for additional processing instructions before completion. The cards are identified with numbered 'tags' to help operators find the correct group for manual searches.

Before the records can be moved out of tagging, where the initial information changes, the updated information is automatically picked up. Herein lies another advantage of the present invention. Unlike systems which are manual, the present information provides for updated information to be automatically picked up by the system since the production facility is provided access to the database wherein updated information is stored.

The mechanism used by the client for entering updated information is also an advantage of the present system. In conventional systems, in order to report a change in cardholder information, the client (i.e., an institution) must send a facsimile with the updated information to the conventional system. Thereafter, the operators must manually enter the information. Not only is this laborious, it can lead to erroneous information being entered. In contrast, with the present invention, the institution need only enter the information electronically from interface 124 to mainframe 106.

The action taken in tagging depends on the type of information change and the record type for which the change of information is being requested. A record may be a daily record or a reissue record. A daily record is typically for a new account and is processed from request through embossment within a day. A reissue record relates to credit card renewal requests. These records typically take longer to fulfill and may take as long as a month.

If the record is a daily record and the information change is an address change, production facility operators locate the card carrier. The address on the card carrier is then modified by placing thereon a label with the new address. It should be observed that the label is automatically generated by the system. If the institution has canceled the order, the record is found and immediately destroyed.

If the record is a reissue record and an address change occurs, the change is implemented in the same manner for the daily record. However, if the information change is a name change or the institution has canceled the order, the change is implemented on a purge date. The purge date is typically selected by the client and identified by their product controls as the last day of the month prior to expiration or one of the first ten days of the month of expiration of the plastic.

At step 212, a final check is performed for any modifications/changes to the record. For example, if there has been an address change, an INSERT/PULL process identifies the records. Changes are accommodated as necessary, either removing the unit from the production process for destruction or redirecting the mailing requirements through automatically-generated mailing labels. At step 214, AS/400 112 moves the records from tagging, completes production and sends the status to mainframe 106.

At step 216, a STATUS UPDATE process on mainframe 106 provides the CIU display screens with the final status of "shipped" or "purged" as appropriate. Clients may manually stop the fulfillment of a credit card by entering a "cancel" status on the CIU product display transaction screen before the CIU moves to the CREATE process or a PURGE status after the CIU is created but before it moves to the INSERT/PULL process. Once the Insert/Pull process is run, the status on the CIU is changed to indicate additional changes will not affect the processing of that record.

At step 218, PIN/POST MAILERS process begins a count down for mailing the PIN after the card is shipped. The mailers are sent to AS/400 112 typically the night before the print date.

At step 220, AS/400 112 receives the mailer records and produces the mailers.

At step 222, the Mailer STATUS UPDATE process updates the mailer status for shipped mailers.

Figure 3B:
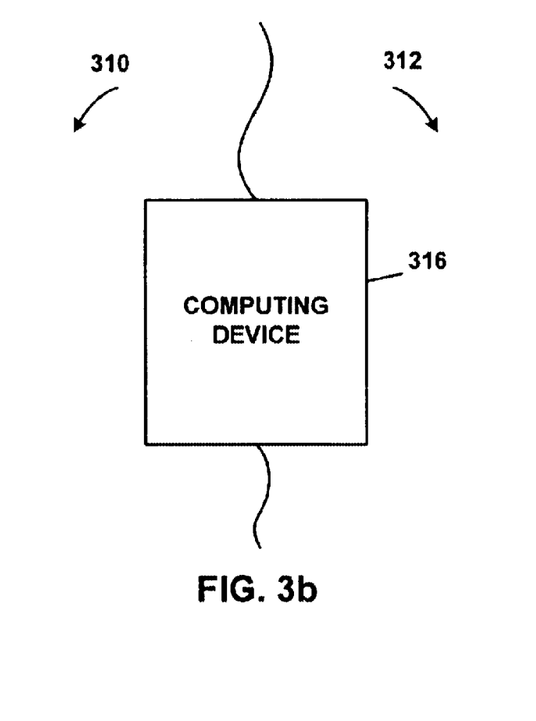
FIG. 3b is an exemplary block diagram illustrating a single processing device for the CIU system of FIG. 1.

Although the process has been described with respect to two separate computing devices namely the mainframe and the AS/400, one of ordinary skill in the art will realize that a single computing device may be utilized. This is more clearly illustrated in FIG. 3b. In FIG. 3b, computing device 316 runs processes for a mainframe system 300 and a production facility system 312 as proves necessary to achieve the functionality of the present invention.

Figure 4:
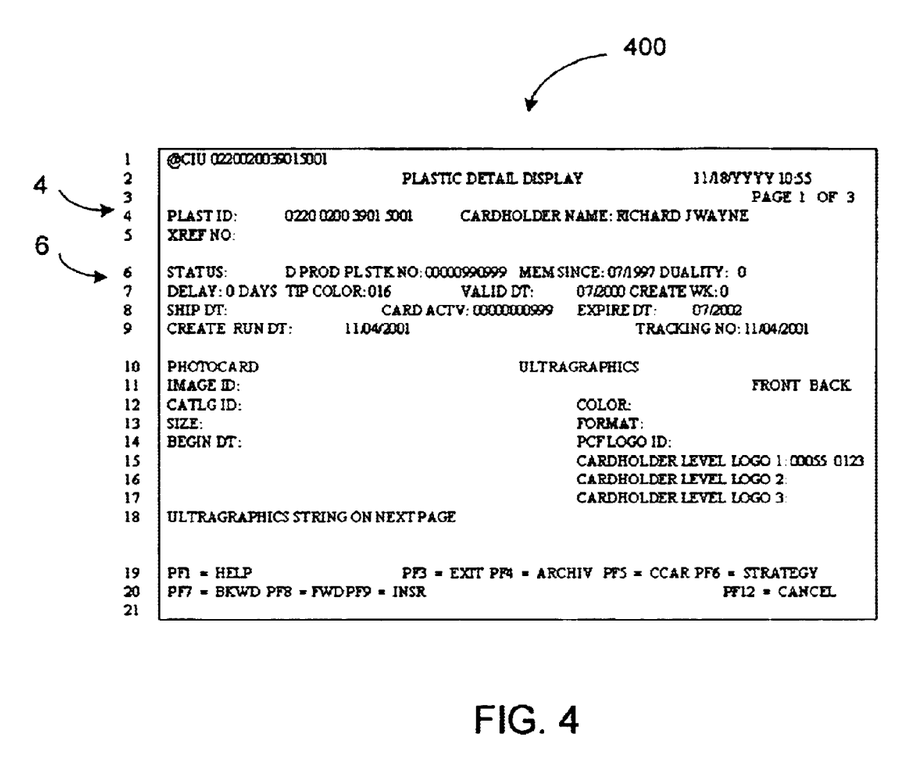
FIG. 4 is an exemplary screen shot of a display screen for displaying CIU production information in accordance with an embodiment of the present invention.

FIG. 4 is an exemplary screen shot of a display screen 400 for displaying CIU production information in accordance with an embodiment of the present invention. Specifically, the capability to display information so that a client can track and obtain information regarding a requested CIU is provided.

Among other information, screen shot 400 comprises a CARDHOLDER NAME. In this case, the cardholder name Richard J. Wayne is shown on line 4. Screen shot 400 further comprises a status code shown on line 6 followed by an abbreviated description of the code. The status code D PROD, as shown, indicates that the CIU is in the production process. Another type of information displayed by screen shot 400 is a plastic stock number, PL STK NO, as shown on line 6. This information identifies the plastic stock number used to produce the CIU.

Although not shown, one of ordinary skill in the art will realize that other displays within the spirit and scope of the present invention may be employed. For example, a CIU transaction display, a card carrier detail display, an insert/additional page detail display, a strategy assignment detail display, and/or a mailer detail display can be employed.

In this fashion, the present invention provides a system for card processing embossing and fulfillment. While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method for processing a card issuance unit, the method comprising:
   storing initial cardholder information about a cardholder at a host computer system, the initial cardholder information for obtaining the card issuance unit associated with a cardholder;
   transmitting a record containing at least a portion the initial cardholder information to a production facility computer system;
   at the time of fulfillment of the card issuance unit, if updated cardholder information is available at the host computer system, transmitting an update from the host computer system to the production facility computer system to supplement or substitute at least a portion or all of the initial cardholder information with the updated cardholder information; and
   fulfilling the card issuance unit with the record having the updated cardholder information.

2. The method of claim 1 further comprising providing a summary row from which the record is selectable.

3. The method of claim 1 wherein updating the record occurs upon receipt of a request from a production facility having sufficient capability to fulfill the card issuance units.

4. The method of claim 1 further comprising forwarding a cancel request for canceling the request, the cancel request being forwarded by a client computer communicably coupled to the host computer system.

5. A method for processing and fulfilling a request for a card issuance unit for a cardholder, the method comprising:
   receiving a request for the card issuance unit at a production facility computer system, the request containing initial information about the cardholder;
   storing the initial information at the production facility computer system;
   receiving updated information at the production facility computer system from a host computer system from the host computer system which changes or supplements the initial information;
   storing the updated information at the production facility computer system;
   selecting the updated information for processing; and
   fulfilling a card issuance unit based on the updated information, wherein the card issuance unit is fulfilled shortly after or relatively close in time to when the undated information is selected.

6. The method of claim 5 wherein selecting the updated information occurs when a production facility has sufficient capacity to fulfill the card issuance unit.

7. A system for processing an embossment request for a credit card, the system comprising:
   a processor;
   a memory;
   instructions stored in the memory which are accessible by the processor to:
   store initial cardholder information for obtaining a card issuance unit associated with a cardholder;
   transmit a record containing at least a portion of the initial cardholder information to a production facility computer system;
   store updated cardholder information; and
   transmit at the time of fulfillment of the card issuance unit, an update to the production facility computer system that supplements or substitutes at least a portion of the initial cardholder information with the updated information.

8. The system of claim 7 further comprising one or more software instructions for assisting in identifying credit cards for which information has changed.

9. The system of claim 7 further comprising one or more software instructions for providing a status update regarding where a credit card is in the production process.

10. The system of claim 7 further comprising one or more software instructions for processing updated credit card records.

11. The system of claim 10 further comprising one or mote software instructions for determining when personal identification numbers are mailed.

12. A method of processing and fulfilling requests for CIUs (card issuance unit) for cardholders, the method comprising:
    receiving multiple CIU requests at a host computer system, the CIU requests containing initial account information about the cardholders;
    storing the initial account information;
    creating records containing at least a portion of the initial account information or an identifier for identifying the account information;
    transmitting the records to a production facility computer system;
    receiving at the host computer system updated account information which supplements or substitutes a portion or all of the initial the account information after the records have been transmitted to the production facility computer system;
    storing the updated account information;
    receiving a request at the host computer system for the updated account information; and
    transmitting the updated account information from the host computer system to the production facility computer system.

13. The method of claim 12 wherein the card issuance unit is a credit card, and further comprising:
    embossing the credit card;
    encoding the credit card with a magnetic stripe;
    indent printing of the credit card;
    providing thermal graphics for the credit card; and
    inserting the credit card in a card carrier.

14. The method of claim 12 further comprising providing status information for each stage of processing.

15. The method of claim 13 further comprising verifying the updated account information remains the same alter embossing the credit card.

* * * * *